United States Patent [19]

Taplin

[11] Patent Number: 5,775,494

[45] Date of Patent: Jul. 7, 1998

[54] FLOATING DISK PRODUCT PACKAGE WITH WINDOW VISIBILITY, SECURE CONTAINMENT, AND INCREASED GRAPHIC SURFACE AREA

[75] Inventor: Jeffrey S. Taplin, Falmouth, Me.

[73] Assignee: DeLorme Publishing Company, Yarmouth, Me.

[21] Appl. No.: 471,580

[22] Filed: Jun. 6, 1995

[51] Int. Cl.[6] .................................................. B65D 85/30
[52] U.S. Cl. ...................... 206/308.2; 206/311; 206/232; 206/776
[58] Field of Search ........................... 206/308.1, 308.2, 206/307.1, 307, 313, 311, 312, 310, 309, 782, 775, 232, 776, 777

[56] References Cited

U.S. PATENT DOCUMENTS

| | | | |
|---|---|---|---|
| 3,530,981 | 9/1970 | Wienecke, Jr. | 206/312 |
| 3,656,612 | 4/1972 | Sellors | 206/782 |
| 4,535,888 | 8/1985 | Nusselder | 206/308.1 |
| 4,702,369 | 10/1987 | Philosophe | 206/310 |
| 4,819,799 | 4/1989 | Nomula et al. | 206/312 |
| 5,022,522 | 6/1991 | Kennedy | 206/307.1 |
| 5,101,971 | 4/1992 | Grobecker | 206/232 |
| 5,188,228 | 2/1993 | Barrett | 206/308.1 |
| 5,219,417 | 6/1993 | O'Brien et al. | |
| 5,253,751 | 10/1993 | Wipper | |
| 5,285,893 | 2/1994 | Misterka et al. | 206/310 |
| 5,307,927 | 5/1994 | Curtis et al. | |
| 5,310,054 | 5/1994 | Stumpff et al. | |
| 5,366,074 | 11/1994 | O'Brien et al. | |
| 5,377,825 | 1/1995 | Sykes et al. | 206/310 |
| 5,385,231 | 1/1995 | Nowotny | |
| 5,407,067 | 4/1995 | Cotter et al. | 206/312 |
| 5,458,235 | 10/1995 | Stone | 206/232 |
| 5,477,960 | 12/1995 | Chen | 206/310 |
| 5,611,426 | 3/1997 | Warfield | 206/309 |
| 5,626,225 | 5/1997 | Joyce, Jr. | 206/308.1 |

*Primary Examiner*—Paul T. Sewell
*Assistant Examiner*—Nhan T. Lam
*Attorney, Agent, or Firm*—Daniel H. Kane, Jr.; Chris A. Caseiro; Thomas L. Bohan

[57] ABSTRACT

A package for a disk product has an inner box formed with outer and inner surfaces spaced from each other for presenting a disk product. The outer surface is composed of substantially transparent material so that the disk product is visible through the outer surface. The box is formed with at least one hub on the inner surface with a free end extending toward the outer surface. The free end of the hub is constructed to pass through the center hole of the disk product. The hub is formed with a holding surface for holding a disk product suspended on the hub so that it does not contact the inner surface. An outer box encloses the inner box. The outer box is composed of material bearing printing and graphics and is formed with inner and outer surfaces. The outer surface of the outer box is formed with a window for visibility of the disk product through the window and outer surface of the inner box. The outer box may be formed with a frame around the window. The outer box may further comprise a bookflap and bookflap window. The outer box also houses documentation and accompanying literature which can also be visible through the outer box window and provides visual background. In an alternate embodiment the disk product is suspended between inner and outer blister packs over a backpiece. In that case the package can be hubless.

44 Claims, 9 Drawing Sheets

FLOATING DISK PRODUCT PACKAGE WITH WINDOW VISIBILITY, SECURE CONTAINMENT, AND INCREASED GRAPHIC SURFACE AREA

TECHNICAL FIELD

This invention relates to a new package for presenting disk products such as CDROM'S to prospective purchasers. The new package differs from the conventional jewel case package for CDROM's. The floating disk is suspended on a hub or pedestal between spaced apart surfaces of the package. The outer surface or upper surface is transparent for visibility of the entire disk product. A transparent plastic inner box and cardboard outer box with outer box window afford necessary security for the disk product inside while also providing adequate graphics surface area to explain the contents of e.g. multimedia and software disks to prospective purchasers. The package can also house documentation or other literature, accompanying the disk product. Graphics or text on the cover of such printed materials provide a preferred visual background at a distance behind the floating disk. The overall package dimensions can be selected to occupy standard shelf space for the benefit of wholesalers and retailers. According to an alternate embodiment, the disk product is suspended between inner and outer blister packs over a backpiece. This alternate package embodiment can be hubless.

BACKGROUND ART

The conventional "jewel case" has become the industry standard package for CDROM disk products. The jewel case is a flat rectangular box composed of rigid relatively thick plastic panels such as a base, liner, and cover that snap or hinge together. For example, the panels may be formed of a brittle plastic 1–2 mm thick. Such jewel cases are described for example in the Stumpff et al. U.S. Pat. No. 5,310,054; the Curtis et al. U.S. Pat. No. 5,307,927; the Wipper U.S. Pat. No. 5,253,751; and the Nowotny U.S. Pat. No. 5,385,231. Non-plastic panels have been used in jewel cases as set forth in the O'Brien et al. U.S. Pat. No. 5,219,417 and the O'Brien et al U.S. Pat. No. 5,366,074, although the basic jewel case construction remains the same.

Disadvantages of the conventional jewel case are encountered as CDROM disk products expand from music into software and multimedia. Software and multimedia works on CDROM disks require substantially more graphic and text surface area to explain the contents of the disk to prospective purchasers than is available with the conventional jewel case. As result, the CDROM disk product housed in a jewel case is often placed in a box with shelf space dimensions for presenting the contents of the disk on the surfaces of the box with novel graphics and text. For example, boxes of competing software and multimedia products use different shapes and sizes to attract attention etc. The boxes must also serve the function of housing documentation and accompanying literature including maps, etc. The end result is a complex packaging that involves both the jewel case inside and an outer box of shelf space dimensions.

A further disadvantage of the double packaging is that the disk product itself is normally not visible through the box. In the standard jewel case it is normally not visible either because it is held behind graphic sheets of paper or cardboard. Art work formed on the CDROM itself is therefore normally not visible. The disk product package must also perform a security containment function to prevent shoplifting of the CDROM. To this end the jewel case is often doubled in the length dimension to avoid a pocket size package and deter shoplifting.

OBJECTS OF THE INVENTION

It is therefore an object of the present invention to provide a new package for CDROM disk products with high visibility of the disk itself and art work on the disk. At the same time the new package provides secure containment of the disk product to deter shoplifting.

Another object of the invention is to provide a new disk product package with substantially increased surface area for graphics and text in comparison with the conventional jewel case. The new package is therefore applicable to multimedia and software products requiring extra space to explain the contents of the CDROM disk to prospective purchasers. The new package also houses documentation and accompanying literature for multimedia and software products.

It is also an object of the invention to present CDROMs or other disk products displayed within an unopened package with the visual effect of the disks floating before a background typically composed of graphics and text printed on the cover of a companion book product or accompanying software documentation.

A further object of the invention is to provide a complete package for CDROM disk products that does not require use of a jewel case inside a larger box. According to the invention the new package dispenses with the requirement for a jewel case at all although it does not preclude such use.

DISCLOSURE OF THE INVENTION

In order to accomplish these results the present invention provides a package for a disk product in the configuration of a box formed with outer and inner surfaces spaced from each other for presenting a disk product between the surfaces. The outer surface is composed of substantially transparent material so that the disk product and any art work on the disk are visible through the transparent outer surface. The inner surface can also include or reveal a visual background of graphics and text at a distance behind and around the exposed disk face.

The box is formed with at least one hub on the inner surface with a free end extending toward the outer surface. The free end of the hub is constructed to pass through the center hole of the disk product. The hub is formed with a holding surface for holding a disk product suspended on the hub so that it does not contact the inner surface.

The entire box can be constructed of substantially transparent plastic. The outer surface of the box can also be formed as a hinged cover with snaps or other interfitting elements for securing the hinged cover in a closed position. According to a further embodiment the inner surface can be formed with first and second hubs for displaying two disk products at two levels. The hubs are positioned so that the disk products overlap each other. Additional hubs can also be provided in the same package for presenting three or more disk products. The hubs are similarly constructed to present the disk products at different overlapping levels.

The transparent box can be vacuum formed out of flexible foldable sheet material. The sheet material is preferably PVC (polyvinyl chloride) and in a size range of for example 13–17 gauge. The package box is therefore flexible and transparent but cannot be broken using hand strength only.

According to the preferred embodiment the transparent plastic box is an inner box of the package. An outer box encloses the inner box. The outer box is composed of a material that bears printing and graphics and is formed with inner and outer surfaces. The outer surface of the outer box is formed with an outer box window for visibility of the disk products through the window and outer surface of the inner box. The outer box houses documentation and literature for the disk product which can also be visible through the outer box window and transparent inner box for reference by the prospective purchaser. The entire package including inner and outer boxes can optionally be enclosed in a shrink wrap transparent wrapping.

In the preferred embodiment the outer box is also formed with a frame around the window. The frame is constructed from specified widths of the outer surface around the window and spacers secured between the inner and outer surfaces around the frame. The frame prevents bowing around the outer box window after the package is shrink wrapped. In another preferred embodiment the outer box is formed with a bookflap hinged at one side of the outer box. The bookflap is formed with a bookflap window overlapping the outer box window.

According to one construction, the inner box is formed with dimensions for loading into the outer box through the outer box window. In that case the bookflap window is formed slightly smaller than the outer box window for holding the inner box in the outer box when the bookflap is closed.

According to another example the hub formed on the inner surface of the inner box extends substantially the distance to the outer surface of the inner box for supporting the outer surface and for maintaining a specified spacing between the inner and outer surfaces. The top of the hub can also be fitted with a cap for retaining a disk product on the hub. Furthermore the holding surface on the hub can be formed closer to the outer surface of the box than the inner for presenting a disk product closer to the outer surface.

According to another example embodiment the disk product can be suspended floating over a backpiece in the package. An inner first blister pack forms a first surface with supporting sidewalls. An outer second blister pack is formed over the first blister pack. The second blister pack forms a second surface with supporting sidewalls. The first and second blister packs are secured to a backpiece at the supporting sidewalls to provide a secure package.

According to the invention one of the first and second surfaces is formed with an indentation for receiving and holding a disk product. The other of the first and second surface areas is formed with complementary specialized surface area for holding the disk product in the indentation. The package can thereby be hubless and still present the disk product suspended over the backpiece.

The indentation can be formed with or without a center hub that extends through the center hole of the disk products. The indentation can be formed to contact the disk product at the inner and outer edges only.

More generally, according to this alternative embodiment first and second transparent surfaces are mounted over a backpiece and form an indentation between the surfaces for receiving the disk product which is therefore suspended over the backpiece.

Other objects, features and advantages of the invention are apparent in the following specification and accompanying drawings.

BRIEF DESCRIPTION OF THE DRAWINGS

FIG. 7C is an end view of outer box alternative embodiment showing compact storage of outer box folded flat, while

FIG. 8B is a perspective view further depicting how double bookflaps open and alternative closure of the double "book-style" version of the new package, while FIG. 8C shows this version in a "closed book" position with

5

CDROMs or other disk products, plus related printed matter, visible to shoppers through the windows in the front and back "book covers".

Figure 9A:
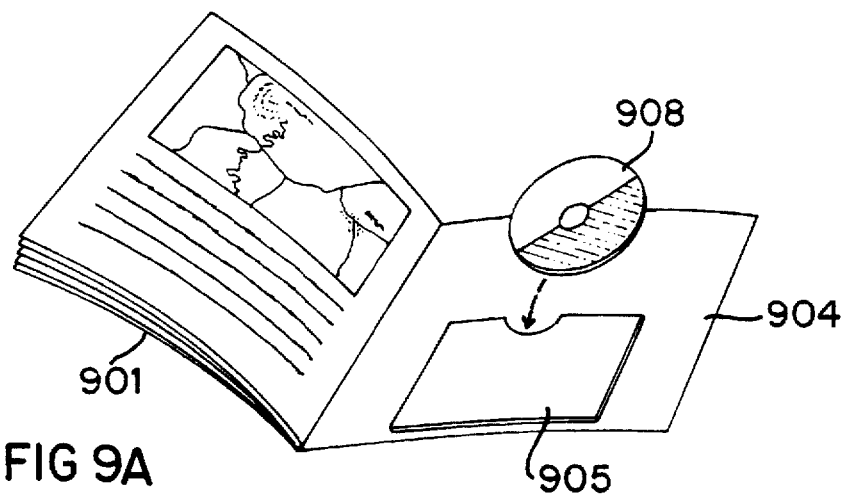

FIG. 9A shows a perspective view of a die-cut pocket, used to hold the CDROM or other disk product in the event for example the packaging is discarded, with the CDROM pocket being attached to the inside back cover of the documentation.

Figure 9B:
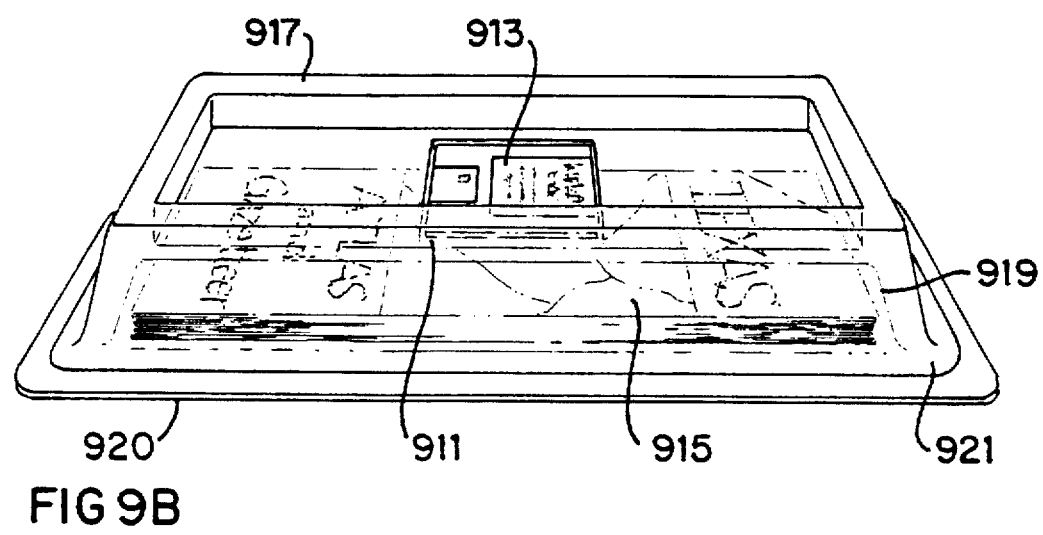

FIG. 9B is a perspective view of an alternative "blister pack" embodiment of the new packaging with transparent inner and outer pieces forming an indentation holding a high density 2.0 MB jacketed disk product. The disk product is suspended above documentation or a related book product, with a printed paperboard backpiece attached around its perimeter to the flange of outer transparent sidewalls to form an outer box.

Figure 9C:
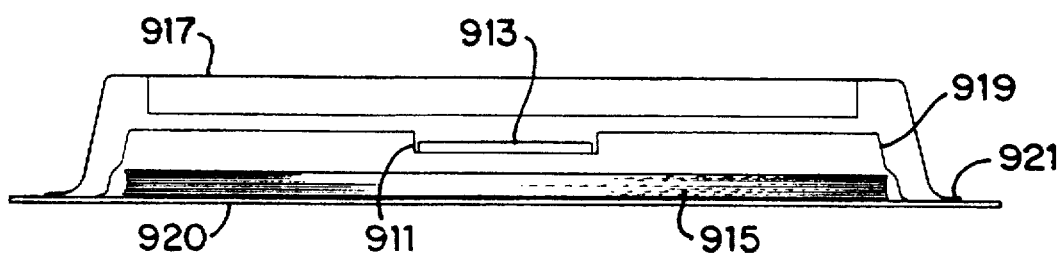

FIG. 9C is a cross-section side view of this alternative blister pack version of the present packaging invention.

DESCRIPTION OF PREFERRED EXAMPLE EMBODIMENTS AND BEST MODE OF THE INVENTION

FIG. 1

Figure 1:
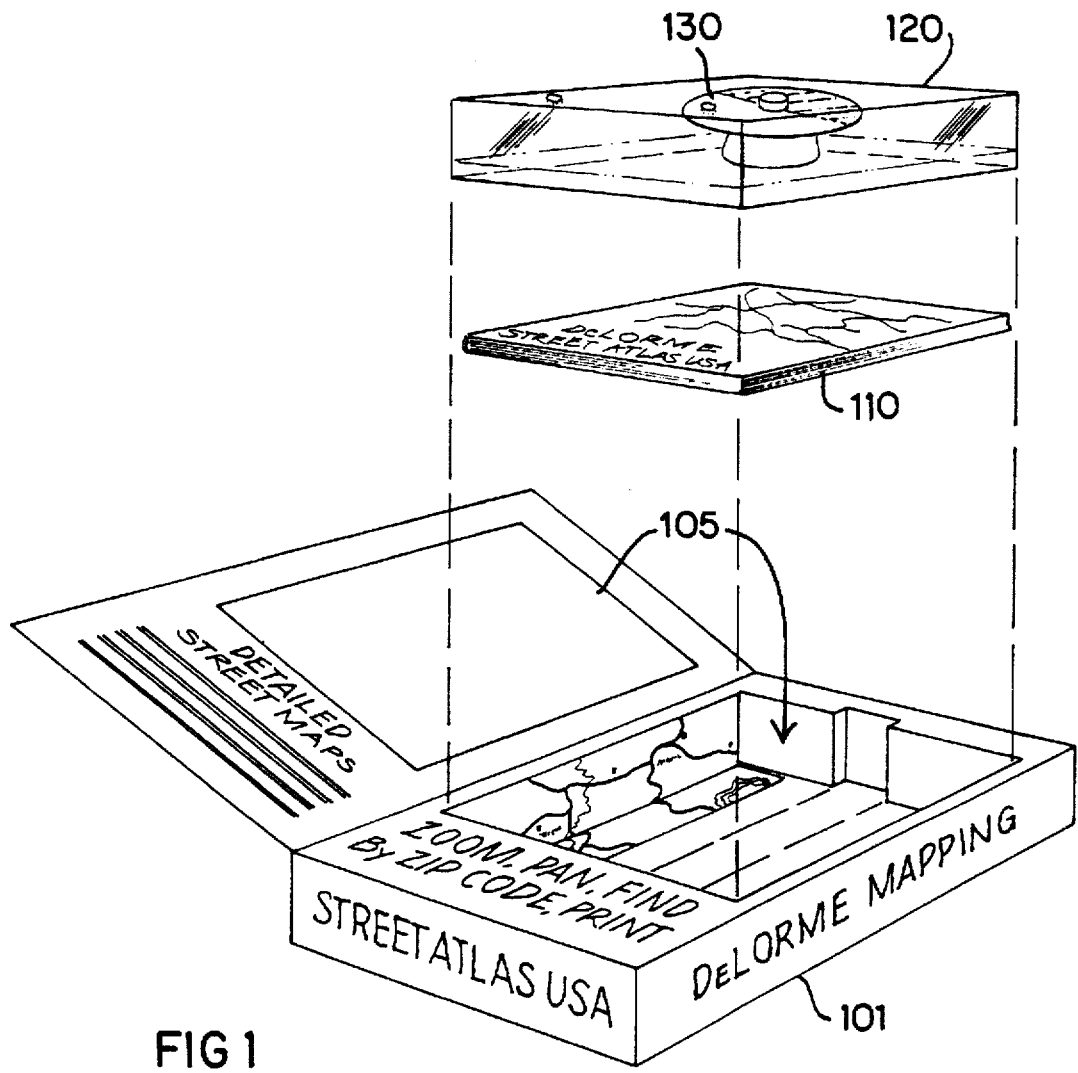
FIG. 1 is an exploded perspective view of the new package preferred embodiment showing a CD-ROM disk product mounted on a hub inside a transparent inner box which is inserted on top of documentation into an outer printed cardboard box with bookflap and window.

FIG. 1 is an exploded perspective view of a disk product package, according to the present invention. The packaging invention is designed typically to securely contain one or more computer CDROMs or other software disk products plus accompanying documentation printed on paper in booklet form. Without breaking open the package, retail shoppers can view the digital disk product itself inside of this packaging. The packaging is designed to retain disk products in an eyecatching position before an expressive background including text and graphics printed on the cover of the documentation or on the interior of the package. This packaging can also be utilized for music or audio CDROMs or other disk media which are not necessarily packaged and merchandised with any extensive instruction manuals, catalogs, or other multi-page accompanying books or documentation printed on paper.

FIG. 1 illustrates a preferred embodiment of the present invention with one CDROM disk product at 130 mounted inside of a transparent PVC inner enclosure 120 that can also contain two or more disk products as disclosed hereafter. This inner enclosure lets potential buyers observe the upper non-data bearing surface of the disk product which is typically adorned with artwork, the product title and brand names, notices, identity of author and/or manufacturer and other messages printed on the exposed surface or jacket of the media. To assemble this preferred embodiment, the inner transparent box 120 with disk 130 inside is placed within an outer container 101 on top the product documentation 110. Words and imagery, printed on the booklet cover and/or interior of the outer box 101, are easily visible to the consumer seeing past the disk product 130 completely through its transparent holder 120.

The outer box shown at 101 in FIG. 1 is typically composed of a substantially opaque, readily printable material, such as paperboard for example, which is cut, folded and fastened in a variety of shapes forming an outside container that is partially open. Shown at 105, openings in the outer box and optional cover facilitate the insertion and retention of the documentation 110 and the inner enclosure 120 in a fashion designed both to enable automated packaging and frustrate shoplifters by resisting easy removal and pocketing of the small disk product(s) of relatively high retail value. These openings shown at 105 in the preferred embodiment, however, also function to permit and entice shoppers in retail settings to view the contents of the packaging, while still sealed and unopened, including the background and the inner sidewall text and/or graphics discernable around the upper face or jacket of the disk product 130. To package disk products with little or no companion printed matter, the documentation or book at 110 is replaced by a single printed sheet (not shown in FIG. 1) that typically describes and promotes the disk product 130 in the foreground to shoppers through its 120 transparent enclosure and the openings 105 in the outside container 101. Or potential consumers likewise can scrutinize expressions printed directly on interior surfaces of the outer box 101 as a pictorial and literal backdrop/sideshow for the disk product appearing center stage in the window or openings 105 of the preferred packaging embodiment.

Figure 2A:
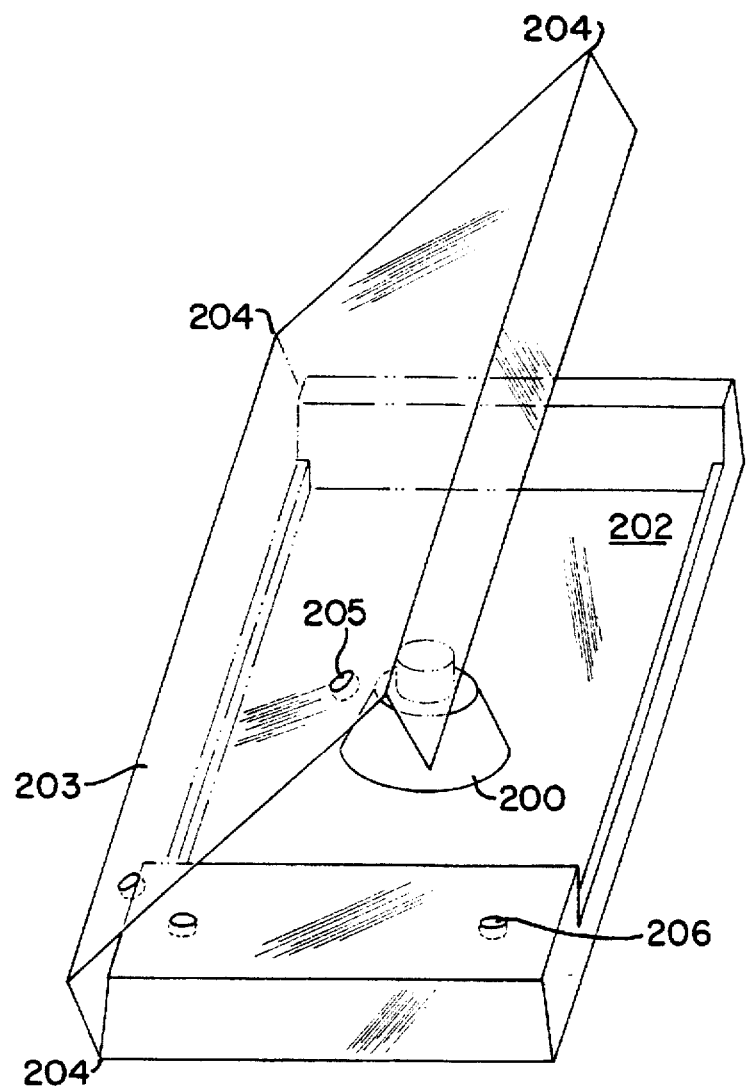
FIGS. 2A is a detailed perspective view of a preferred embodiment of a substantially transparent inner box with hinged lid in half-open position.
Figure 2B:
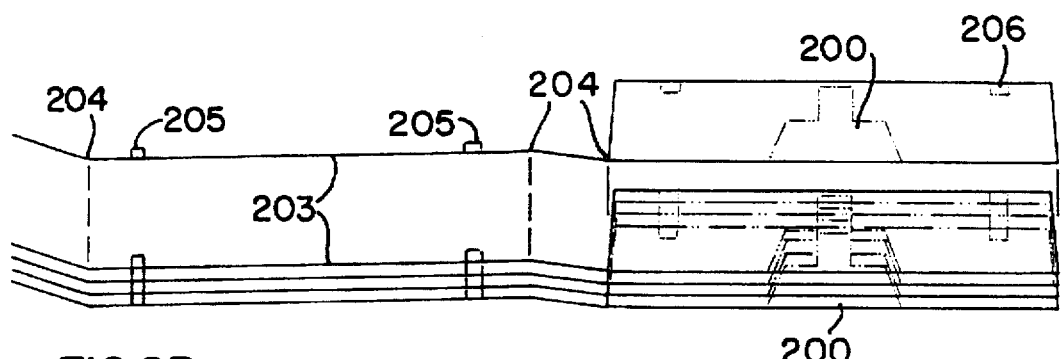
FIG. 2B is a side view of a nested group of the clear inner CDROM boxes with top lids folded wide open so that the boxes stack together, reducing storage and shipment space.

FIGS. 2A and 2B

FIG. 2A is an exploded perspective view of a preferred embodiment of the inner box component of the new packaging. This embodiment for securely holding a CDROM (not shown in FIG. 2A) is preferably made out of a substantially transparent material such as PVC, typically by thermoforming or vacuum molding. The inner box so formed bears a resemblance to a candy box, with an outer surface 203 comprising the top lid. The lid portion of the inner box is creased in the manner of a hinge in three places 204 in order to fold shut over the open container portion. Snaps, or friction-fit male-female latching features, at 205 and 206 serve to keep the inner box shut. Adhesives or other attachment means can additionally or otherwise be used to seal the inner box shut. Approximately in the middle of the bottom or inner surface 202 of the inner box, at least one pedestal or mount 200 for suspending or holding a CDROM or other disk product is formed, as detailed more in relation to FIGS. 3A–3D.

FIG. 2B presents a side view of the stacking or nesting of a group of the preferred embodiment clear inner CDROM boxes, one of which is illustrated in FIG. 2A. In FIG. 2B, the top lid 203 is folded out flat or wide open, bending on creases or hinges 204 formed in the top lid. The inner boxes, as well as the hubs or pedestals 200 for mounting the CDROMs, are shaped to enable such stacking or nesting, which reduces the space requirements for storage and shipment of these packaging parts.

FIGS. 3A–3D

FIGS. 3A, 3B, 3C and 3D present details of the CDROM hub and pedestal also shown at 200 in FIGS. 2A and 2B.

Figure 3A:
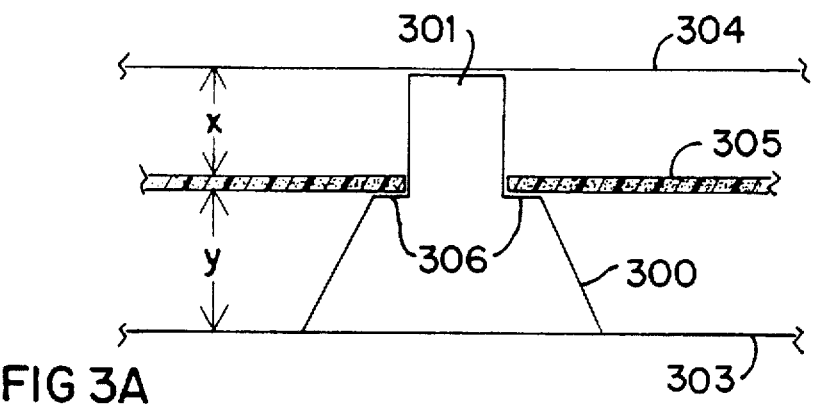
FIGS. 3A is a fragmentary cross-section view through the center of the hub showing the suspension of a CDROM on the hub's holding surface with the hub extended up through the hole in the center of the CDROM to support the outer surface.

FIG. 3A is a fragmentary side cross-section view through the center of a columnar hub 301 on top of its base or pedestal 300. This structure, formed from the inner surface or bottom 303 of the preferred inner box embodiment, includes a rim or plateau at 306, forming a holding surface for a CDROM 305. The CDROM is suspended or rests on this holding surface 306 at some interval ("Y") above the inner surface or inner box bottom 303. Likewise, the CDROM rests or is held at some distance ("X") below the outer surface or top lid 304. FIG. 3A reveals an embodiment in which the hub 301, retaining the CDROM 300 by friction fit through its center hole, is further extended to form a column for supporting the top lid or outer surface 304.

Figure 3B:
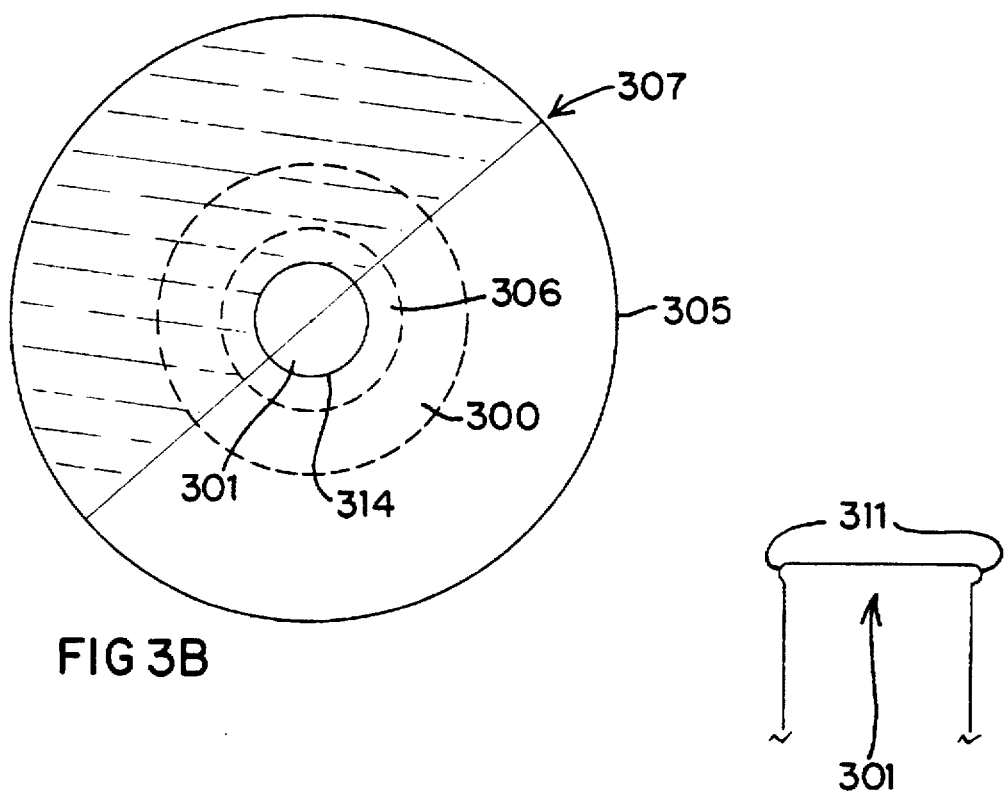
FIG. 3B is a detailed top plan view of the hub with disk product suspended on the hub and resting on the holding surface of the hub.

FIG. 3B is a top or plan view of a CDROM 305 mounted on a hub 301. The CDROM 305 may be decorated with text messages (not shown) and/or artwork or graphics, for example, different colors on either side of a diagonal diameter line 307. Such text and/or graphics are visible to the consumer through the substantially transparent top lid or outer surface of the inner box. Optional visual registration marks 314, or physical depressions or bumps, in or on top of the hub facilitate proper alignment of the CDROM by eye or as mounted by automated packaging machinery. The CDROM rests on a holding surface or rim 306 formed at the junction of the hub 301 and the pedestal or base 300.

Figure 3C:
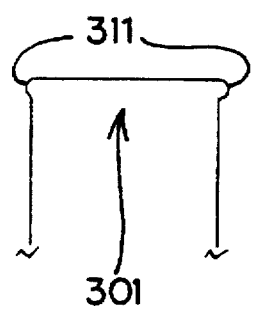
FIG. 3C is fragmentary side cross-section view through the top of the hub showing an expanded lip at the top of hub for retaining a disk on the hub.

FIG. 3C is a fragmentary cross-section through the top of the mounting hub 301 for the CDROM. Much like the center holder portion of a conventional CDROM jewel case, one means to retain the CDROM is an enlarged but compressible tip 311 around the top of the hub. Alternatively or additionally, the CDROM is held by friction fit inasmuch as the diameter of the hub 301 is slightly larger than the diameter of the center hole in the CDROM. Tests indicate that a minimum thickness of about 15 gauge PVC is useful to form a friction fit hub which will securely, but removeably, retain a CDROM under typical shipping conditions. 20 gauge PVC, or thicker, however, is inadequately transparent, obscuring the consumer's view of the CDROM artwork and other interior graphics and text. There is one disadvantage shared by friction-fit and enlarged hub tip means for holding CDROMS by their centers, that is also a disadvantage of the hub extended upwards as a column to support the upper surface. These features all complicate tight stacking and easy unstacking of the inner box parts for storage, shipment and assembly, as shown in FIG. 2B.

Figure 3D:
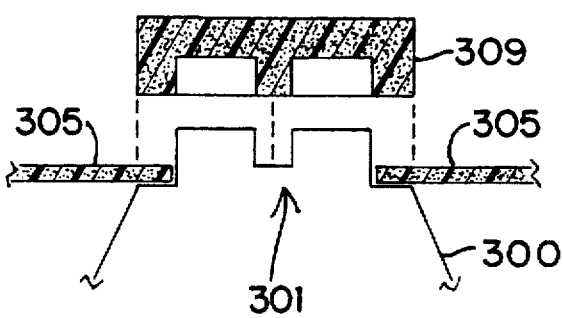
FIG. 3D is a fragmentary side cross-section view through the top of a modified hub showing an alternative cap or retainer piece for securing the CDROM in place on the hub.

FIG. 3D is a fragmentary side cross-section view through an alternative hub 301 for holding a CDROM 305 by the hole in its center on the pedestal 300. As shown in cross-section at 309, a cap or retainer device is pressed down and friction fitted onto an appropriately shaped and sized hub tip. This alternate means for securing the CDROM has advantages in allowing a hub size and shape more conducive to compact stacking of inner box parts. It has the disadvantages of involving one added part, i.e. the cap or retainer, and the added step in package assembly of attaching the cap properly.

Figure 4A:
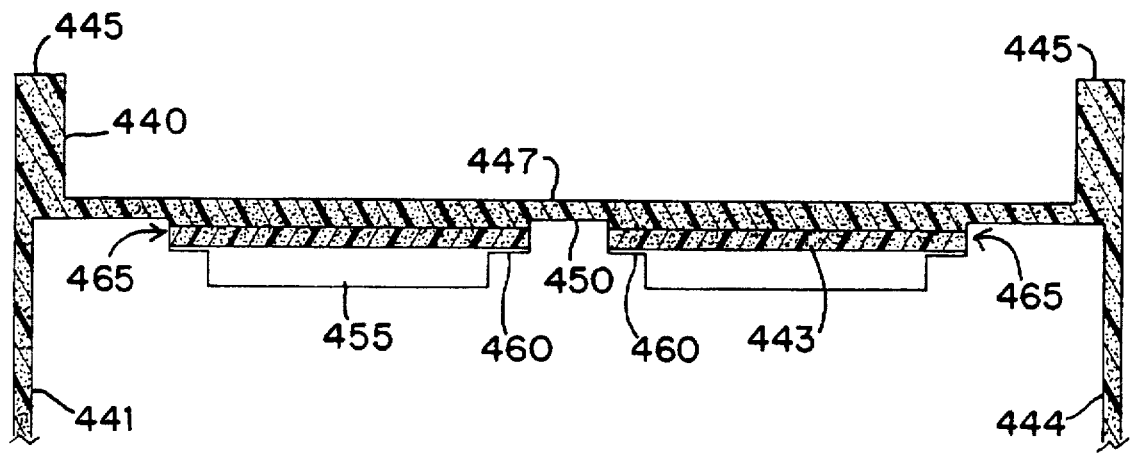
FIG. 4A is a cross-section side view of an alternative embodiment of the transparent inner box comprised of a lower piece which fits within an upper piece and forms an indentation between the two pieces wherein a CDROM is suspended over the backpiece.
Figure 4B:
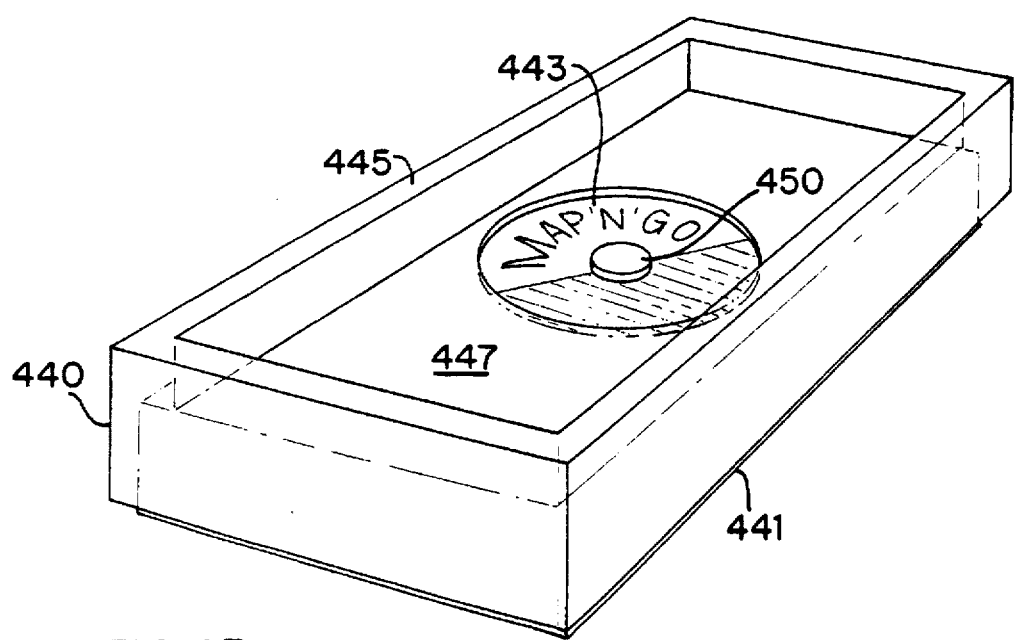
FIG. 4B is a perspective view of this alternative inner box comprised of two nesting pieces holding a CDROM.

FIGS. 4A and 4B

FIGS. 4A and 4B depict an alternative embodiment of the inner box or disk holder component of the present new packaging invention. On the one hand, the embodiment sketched in FIG. 4A and 4B offers an alternative inner box structure to the preferred embodiment inner box already disclosed in relation to FIGS. 2A and 2B, for insertion within an outer partially open box as shown in FIG. 1. On the other hand, the FIG. 4A and 4B embodiment is also adapted for the "blister pack" version of the packaging invention further disclosed hereafter in relation to FIGS. 9B and 9C.

FIG. 4A is a cross-section view of this alternative disk holder component comprised of a lower 441 and an upper 440 piece of a substantially transparent material such as PVC plastic. The disk product or CDROM 443 is held in an indentation, enclosure or cavity 455 shaped between these upper and lower pieces. The two pieces are further formed, typically by a thermoforming or vacuum molding process, such that the lower piece 441 "nests" or snugly fits within the upper piece 440. Friction-fit between the upper and lower pieces, supplemented as needed by other means such as adhesives or plastic welding, attaches the two pieces together to form a secure inner disk product container. The upper piece also forms a top or outer transparent surface 447 through which retail shoppers can view the disk product as well as background graphics and text. The disk product or CDROM 443 itself is spaced away from the inner and outer surfaces of the overall packaging, for desired visual effect, by the upward or outward extensions 445 from the upper piece 440 in conjunction with inward or downward extensions of lower 441 and upper pieces 440 creating a bottom edge 444. In this way, this alternative inner enclosure, having an "H" shaped internal cross-section, nonetheless can have the same dimensions and overall shape around its outside edges as the preferred "candy box" embodiment, detailed in relation to FIG. 2A and FIGS. 3A–3D, for interchangeable fit inside of the same outer box components.

As shown in FIGS. 4A and 4B, the CDROM 443 is retained in a cavity or indentation 455 formed between differentially shaped upper 440 and lower 441 pieces. The CDROM can be secured by its center hole, resting on a rim or holding surface 460 and retained by friction fit etc. around a hub 450, as already disclosed above in relation to FIGS. 3A–D for a preferred embodiment inner box. Additionally or alternatively, this alternative two piece nesting embodiment can also retain the disk product 443 by friction fit and/or an optional compressible lip at points around the circumference of the disk product or CDROM, as indicated at 465 in FIG. 4A. This two piece nesting embodiment is adaptable to serve as a "hubless" inner disk product holder. To prevent scuffing of the lower data-bearing side of the CDROM media, a space or cavity is formed under the data-bearing part of the CDROM.

Suspension of CDROMs, or other disk products, by means of mounting on a hub through the center hole is preferable in terms of visual effect. A disadvantage of "nesting" disk products in indentations or cavities is that shaping the transparent pieces to hold the disks can compromise or distort product visibility, particularly of the background graphics and text. All distortion of the transparent material is virtually hidden beneath the CDROM with the preferred pedestal and hub embodiment. Glare and other distracting reflection effects are also minimized by the "candy box" style inner box with the transparent bottom or inner surface resting directly on the documentation underneath. Certain disk products, however such as second generation high density 2.0 MB disks, are surrounded or shrouded by a rectangular jacket such that the disk center hole cannot be mounted on or penetrated by a hub. Therefore, as detailed more in relation to FIGS. 9B and 9C hereafter, this alternative two piece nesting embodiment has the advantageous capability to retain and grasp "hubless" digital disk products by friction fit at points along the rectangular edges of the jacket of a high density disk, for one example, or around the circumference of circular disk products.

Figure 5A:
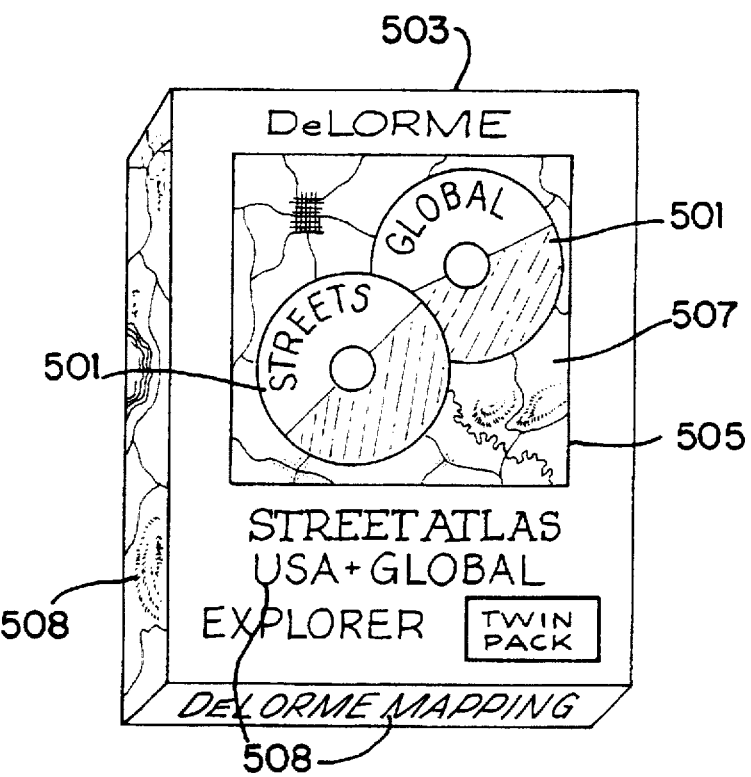
FIG. 5A is a perspective plan view of the new package for presenting two disk products both visible against a background of text and graphics through the outer box window.
Figure 5B:
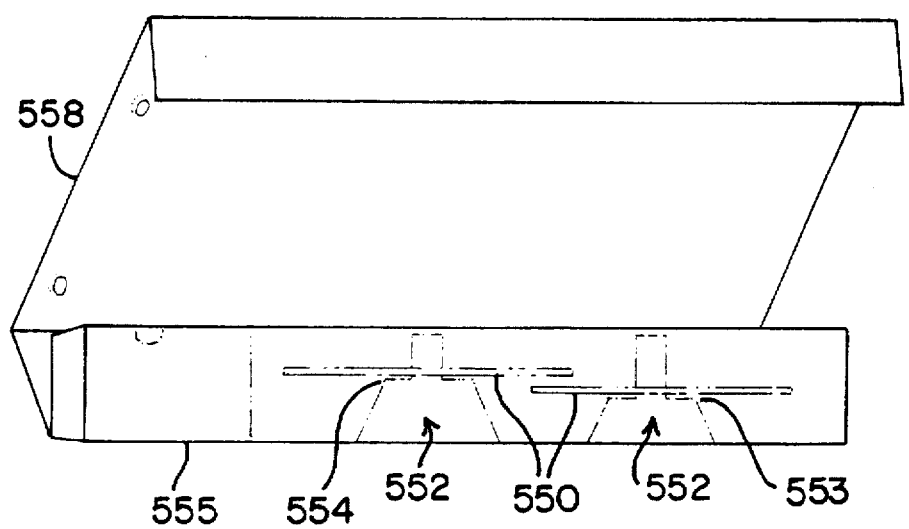
FIG. 5B is a detailed cross-section view through the hubs of this two disk version of the inner box showing the overlapping positions of the two disk products.

FIGS. 5A and 5B

FIGS. 5A and 5B illustrate an application of the present invention to package two or more disk products visible against a background of text or graphics.

FIG. 5A is a perspective plan view of an assembled double or twin disk product package 503, which displays two overlapping CDROM disk products 501, as visible within an unopened package to retail consumers through the outer package window 505. Note that the consumer can also see a background of graphics and text 507, printed on the interior of the package and/or on the front cover of documentation or a related book product also packaged within. Therefore, selling and product information printed on the outside of the package as graphics and text 508 is enhanced or augmented by the opportunity for visual inspection of the exposed faces of the disk products themselves and background information inside of the packaging. Depending on the size of windows and disks, three or more disk products can thus be displayed. While visualization of the whole face of every disk is preferable, more disks can be made visible in a given window by overlapping the disks, as shown in FIG. 5A and further detailed in FIG. 5B. More CDROMs or other disk products can also be made partly visible in a specific window by tucking parts of the disk faces under the window frame. The invention includes alternative embodiments which implement a floating window presentation of but one or only a few disks out of a larger packaged set. The other disk products can either be hidden inside such a package or appear as part of the visual background behind the flagship disk product floating in its window.

FIG. 5B is a detailed cross-section view of a double disk version of the preferred embodiment inner transparent box. This inner box embodiment for one disk was pictured and discussed in relation to FIG. 2A and 2B above. Viewed from its long side, in FIG. 5B, this double disk version exhibits two pedestals or bases 552 for mounting a couple of CDROMs 550, instead of the one pedestal 200 in FIG. 2A. To permit overlapping of the visible face of the CDROMs, the rim or holding surface 554 of one of the pedestals is higher than its counterpart 553. Various optional or complementary structures for securing the CDROM on the rim or holding surface may be utilized, as detailed above in relation to FIGS. 3A–3D. The two disk version also utilizes a top lid 558, which folds and latches shut to form a secure inner box, detailed above in relation to FIG. 2A. Ready capability for holding of plural CDROMs in such an overlapping configuration with superior visibility is a further advantage of the preferred pedestal/hub disk mounting embodiment of the inner box. But, the alternative two piece nesting inner box embodiment, detailed above relative to FIGS. 4A and 4B, can also be adapted to visibly hold two or more disk products within a plurality of indentations or cavities formed between its upper and lower pieces.

Figure 6A:
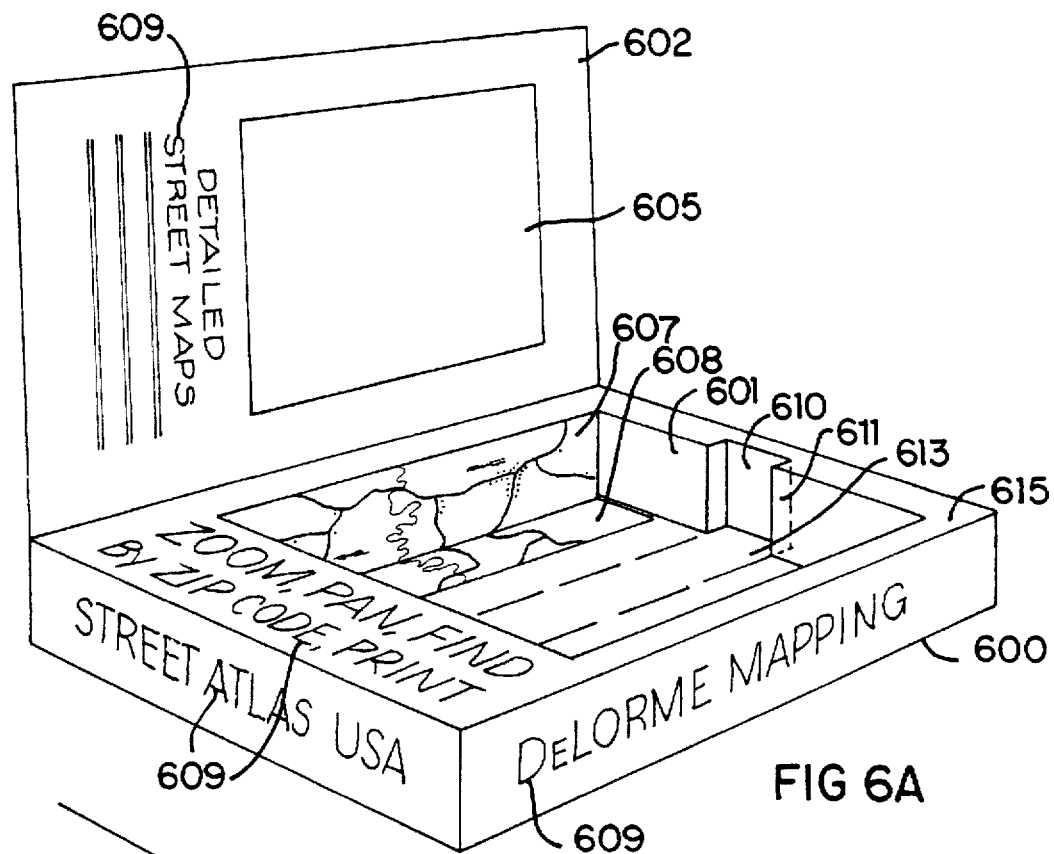
FIG. 6A is a perspective view of a preferred embodiment of the outer box bearing graphics and text with a bookflap and respective windows, and showing the frame around the outer box window or opening.
Figure 6B:
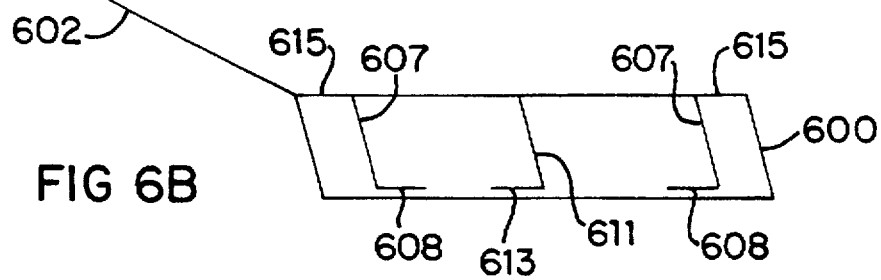
FIG. 6B is an detailed end view of the outer box with end flap open showing how the outer box folds or collapses to reduce storage and shipping space.
Figure 6C:
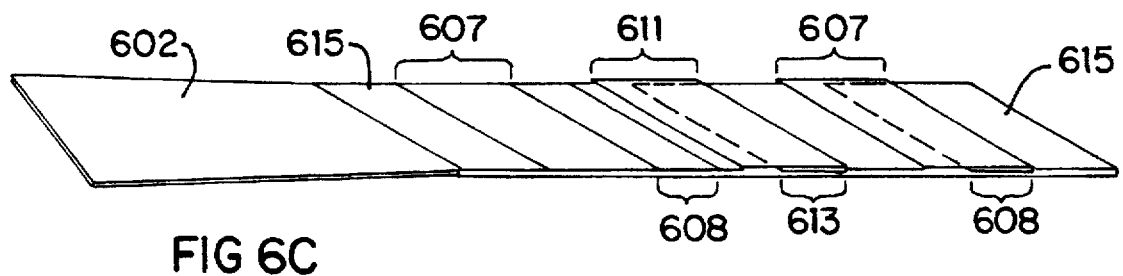
FIG. 6C is a similar view with the outer box lying nearly flat.

FIGS. 6A, 6B and 6C

FIG. 6A, 6B and 6C are directed to a preferred embodiment of the outer box component of the present packaging invention. This outer box component is generally comprised of a substantially opaque material, such as paperboard, which is readily printed, cut, folded, and fastened by adhesives or otherwise in a variety of shapes by means well-known in the packaging arts. Moreover, the outer box is generally partially open, meaning one or more apertures or windows are cut in the opaque walls of the outer box in order allow the consumer to visually inspect the contents of the package. These apertures or windows raise possible problems of theft and sealing the package contents against infiltration of dirt or moisture. These problems are resolved, at least in part, by use of a substantially sealed inner boxes, disclosed already for alternate embodiments in relation to FIGS. 2A, 4A and 4B. Shoplifting and contamination can also be minimized alternately or additionally by "glazing" the windows of the outer box with a substantially transparent, theftproof material and/or by means of shrink wrapping the whole package after assembly and inserting its contents. But, multiple layers of transparent material have the disadvantage of obscuring visibility into the packaging, which is a central object of the invention. One more design problem is to make the packaging easy to assemble, preferably by automated processes, yet hard to break open in retail settings to prevent pocketing and pilferage of the high value disk product contents.

FIG. 6A is a perspective view of a preferred embodiment of the outer box part 600 of the new packaging. After assembly, a main window or aperture at 601 remains open in the outer box. In this embodiment, the window 601 serves both to facilitate viewing inside the package and for loading or inserting the contents into the package. This preferred embodiment also comprises a bookflap 602 with viewing window 605. The outer box exterior and bookflap inside and outside are printed with text or graphic information at 609. The bookflap option thus serves to further increase the printable surface area of the packaging, especially if its inside surface is visible in the retail setting, at least for one sample package. On the other hand, by cutting the bookflap window 605 to be somewhat smaller than the main package window 601, and by securing the bookflap shut over the main package window, theft of the package contents is frustrated.

With FIG. 6B, FIG. 6A also demonstrates the interior structure of this preferred outer box embodiment. The main outer box window 601 is surrounded by a frame or border 615 which contributes, among other things to the rigidity of the packaging. Along the sides of the main outer box window 601, an internal sidewall 607, typically printed with graphics and text, is formed by cutting out, folding and gluing down 608 part of the paperboard removed to form the main window. Besides increasing the rigidity of the outer box and increasing the overall surface area available for print and graphics, these sidewalls 607 serve also as spacers helping to keep the inserted inner box component centered in the main package window, rather than displaced under the window frames. An alternative spacer is shown at 611, as cut partly from the window frame at 610 along the end of the box, and attached by adhesives or other means to the box bottom at 613.

The spacer and/or sidewall structures 607, 608, 611 and 613 are again revealed in FIGS. 6B and 6C which offer detailed end views of the preferred embodiment outer box, prior to its final assembly with end flap open. FIG. 6B is an end view of outer box almost in its upright or expanded position, for example, for intermediate assembly such as the folding and gluing down of the interior spacers and sidewalls. FIG. 6C shows how this outer box embodiment can be collapsed or folded virtually flat, saving space in storage and shipping, even with spacers and sidewalls glued in position. This design facilitates separate manufacture and stockpiling of the outer box component for later shipment to the disk product manufacturer for final assembly and packaging.

Figure 7A:
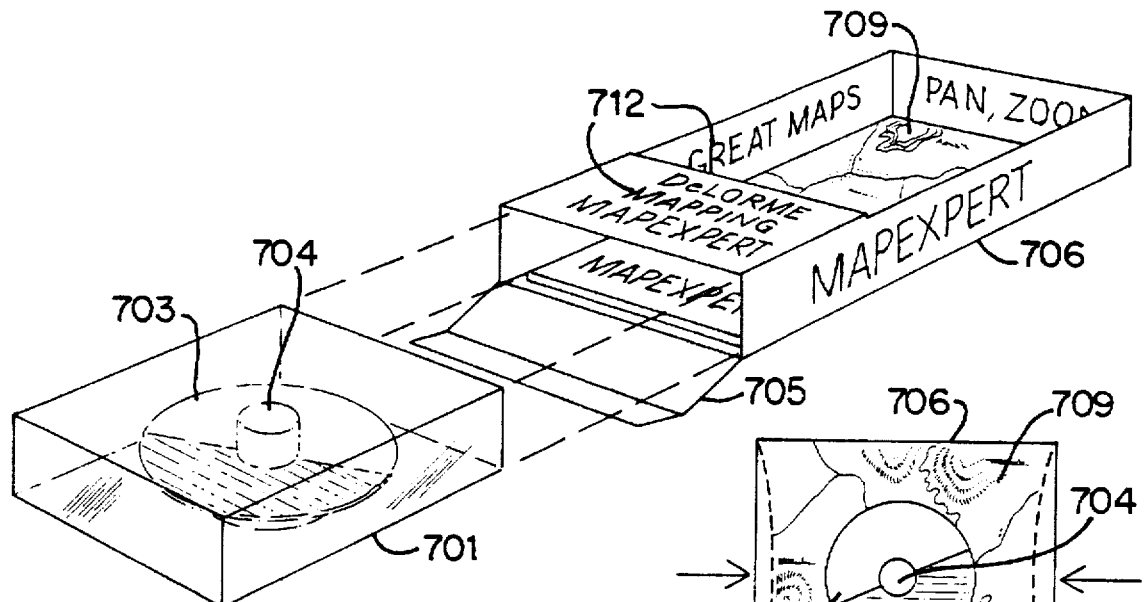
FIGS. 7A is an exploded perspective view of the new packaging showing a preferred inner box embodiment being loaded into an alternative outer box, with unframed window, through the end flap of the outer box.
Figure 7B:
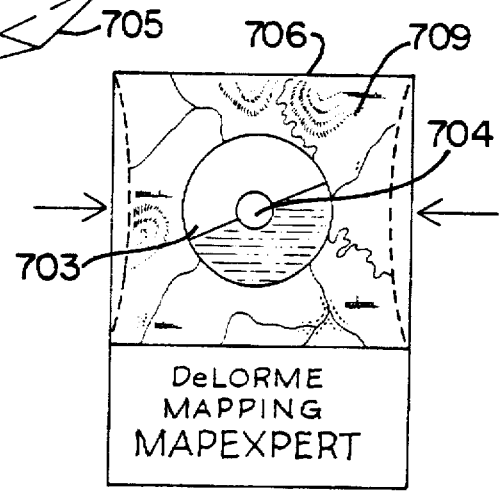
FIG. 7B is a plan view showing the "bowing" problem that arises with this alternative embodiment after a shrink wrap is applied and there is no structural frame around the outside of the outer box window.

FIGS. 7A and 7B

FIG. 7A is an exploded perspective view of an example of the new packaging invention with an alternative embodiment outer box 706, generally simpler than the preferred embodiment of the outer box detailed above in relation to FIGS. 6A and 6B. The simpler FIG. 7A outer box is also printed inside and out with text and graphics 712. The end flap 705 is open. Documentation 709, the cover of which provides a graphic and text background within the assembled packaging, has been loaded in the bottom of the outer box. At 701, a preferred embodiment of the inner box is depicted with CDROM 703 mounted on a pedestal/hub 704. This inner box is about to be inserted in through the open end flap 705 on top of the documentation 709.

FIG. 7B is a plan view of this example of the packaging invention after assembly, showing the CDROM 703 visible in the package window against a background formed by printed graphics and text on the documentation cover 709 and interior sidewalls. This packaging example could also be implemented with a plural disk version of the inner box, as detailed above relative to FIGS. 5A and 5B. Moreover, as detailed above in relation to FIGS. 4A and 4B, a two piece nesting embodiment of the inner box might be substituted within this packaging example for the preferred pedestal/hub candy box embodiment at 701.

This simpler outer box embodiment at 706 has disadvantages, related to its "unframed" sidewalls. There is a problem of the sidewalls "bowing" inward, indicated by arrows in FIG. 7B, as a result of shrink wrapping the assembled packaging. Furthermore, it is more difficult to automate assembly and final packaging for want of the rigidity added by a frame or border structure around the window as shown at 615 in FIGS. 6A and 6B. In other words, though it's more complicated and costly, the outer box embodiment with a "framed" main window, as disclosed in relation to FIGS. 6A and 6B, provides greater rigidity for reliable positioning on an automated packaging line and resistance to deformation in the course of automated loading of contents. Top loading of contents also proves easier, both by human hands and automated processes, than insertion of the documentation 709 and inner box component 701 in through the open end flap 705, as shown in FIG. 7A.

Figure 7C:
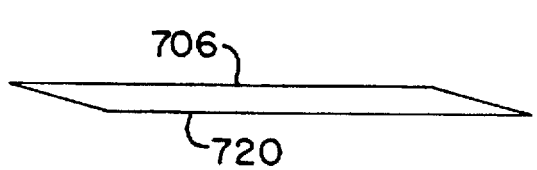
Figure 7D:
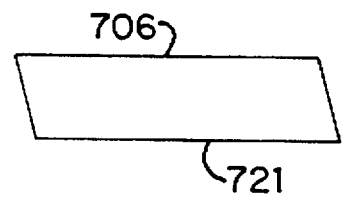
FIG. 7D is a similar view showing how the outer box folds up into an open position for assembly and packaging.

FIGS. 7C and 7D offer end views of the simpler outer box 706, with end flap open, showing how this embodiment is tipped open or expanded for assembly 721 from a flattened position 720 conducive to compact storage and shipment.

FIG. 8A, 8B and 8C

Figure 8A:
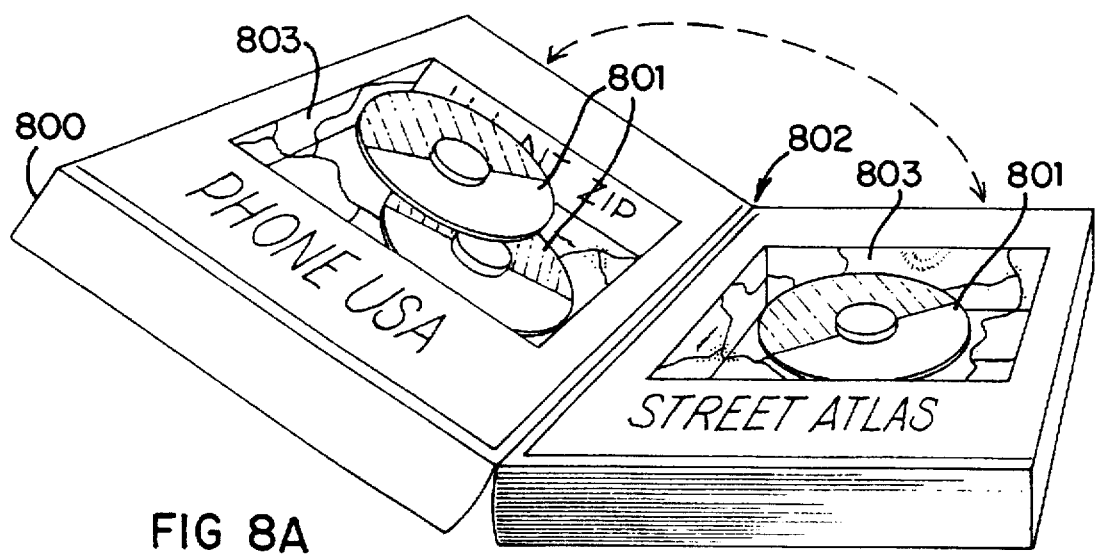
FIG. 8A is a perspective view of a twin pack or double box "book-style" version of the present packaging invention, holding and displaying two or more disk products in "open book" position.
Figure 8B:
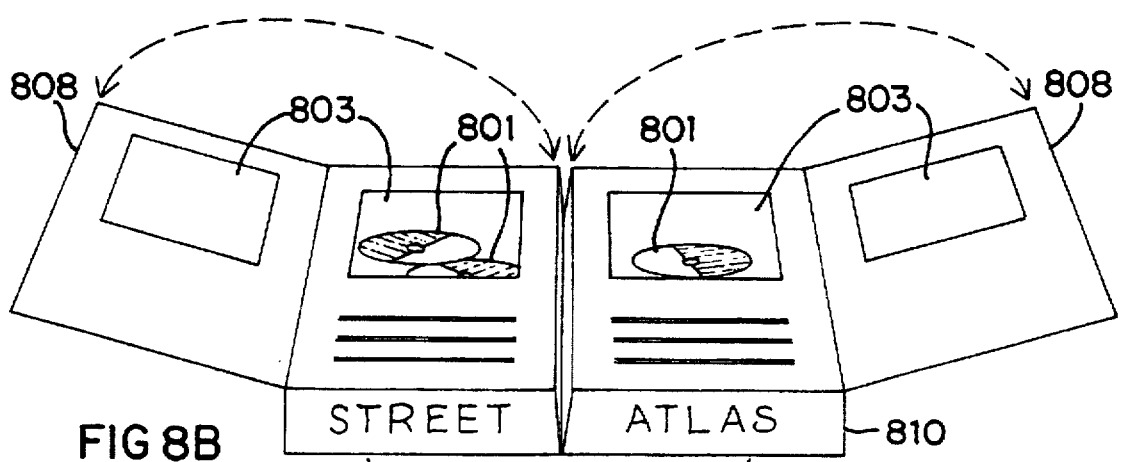
Figure 8C:
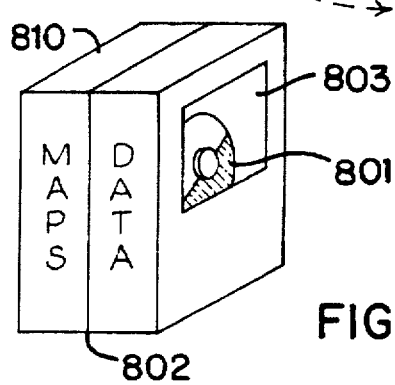

FIGS. 8A, 8B and 8C are directed to a "bookstyle" version of the packaging invention devised for retailing of multiple CDROMs or other disk products, particularly in the distribution channels and outlets already accustomed to merchandising books and other conventional publications printed on paper. This "bookstyle" packaging is also designed for maximum visual interest in retail settings already involved in software and multimedia sales. In general, the "bookstyle" package is achieved by hinging together two or more examples of the present packaging invention to form a multiple package which resembles a book, particularly as it opens along the hinge or flexible connection 802. Additionally, such "bookstyle" packages may be shaped and decorated to resemble an hardbound book, for example, as a visual gimmick.

FIG. 8A is a perspective view of an example of "bookstyle" packaging 800 according to the present invention. This overall package is comprised of a pair of assembled window packages that are joined together by a hinge 802. Each half of the open book, so to speak, includes a typical embodiment of the invention, as disclosed in relation to FIGS. 1 and 5A, for example. There are two windows 803, showing single or double disk products 801 inside the packaging. Also visible through the windows 803 are background graphics and text typically printed on the interior sidewalls and on the cover of associated documentation or paper book products. The example shown in FIG. 8A closes a lot like a real book such that the package windows are hidden inside.

FIG. 8B is a perspective view of another example 810 of this "bookstyle" embodiment of the present invention. Double and single disks 801 again appear through windows 803 in each "half" of the overall packaging joined together by a hinge 802. FIG. 8B further reveals bookflap options 808 which can be opened once the "bookstyle" package is in an "open book" position. While the example in FIG. 8A closed so as to hide the package windows and contents, the FIG. 8B example is hinged 802 differently. As further illustrated in FIG. 8C, the FIG. 8B and 8C version of a "bookstyle" package 810 is hinged 802 and closes like a book such that the disks 801 and interior background are quite visible to the retail consumer who judges this unopened package or "book" by observing its contents through the windows 803 that pierce its outer "covers".

FIGS. 9A, 9B and 9C

FIG. 9A is a perspective view of an actual paperbound book 901 opened to its last page on the left and its inside back cover 904 on the right. The present packaging invention is especially suited but not limited to packaging for disk products marketed in conjunction with documentation, instruction manuals, a companion book product, catalogs or other related conventional paperbound printed materials. A preferred application of the invention is for packaging of one or more CDROMs in conjunction with related printed paperbound books. For example, DeLorme Mapping, Freeport ME 04032, assignee of the present invention, has marketed a joint CDROM and paperbound atlas of North America titled MAP'N'GO (tm). Software titles on CDROM or more traditional disk media typically are packaged with considerable printed documentation by contrast with music CDROMs, for example. Moreover, preferred embodiments of the present invention dispense with the "jewel case" standard container for CDROMs in the interest of reducing packaging costs and increased visibility of the CDROM itself. Furthermore, many embodiments of the present invention are disposable i.e. unlikely to be retained by the consumer long after purchase. Therefore, FIG. 9A shows a die-cut receptacle or pocket 905, like pouches glued inside the back of library books for holding old fashioned library cards. A CDROM 908 can be conveniently stored inside the back cover of associated documentation or a companion booklet 901 within such a pocket or receptacle 905. This handy holder in the back cover of related printed matter can be adapted, reshaped and resized to contain other standard disk products like traditional floppy diskettes or modern jacketed 2 MB high density disks.

FIGS. 9B and 9C concern a "blister pack" embodiment of the present invention. Generally, blister packs comprise a backpiece 920 of paperboard or other substantially opaque material suitable for printing. In general, the backpiece 920 is attached by glue or other means roughly along its perimeter to a flange 913 formed around the bottom of the "blister" 917, which is typically three dimensional, made of transparent material such as PVC and shaped approximately like its contents. FIG. 9B and 9C illustrate an improved blister pack, according to the present invention, which adapts the two piece nesting embodiment of the inner disk holder as already detailed above in relation to FIGS. 4A and 4B.

FIGS. 9B and 9C picture an example of packaging, according to the present invention, for a single disk product 913 marketed with a related paperbound book product, hardcopy documentation or other printed material 915. A jacketed high density 2 MB disk 913 is shown held by friction fit around its rectangular perimeter in a cavity or indentation between the outer or upper 917 and lower or inner 919 pieces. While the packaging strategy connected with the present invention usually dispenses with the standard "jewel case" CDROM container, a CDROM inside of a standard rectilinear "jewel case" with transparent cover is readily packaged according to the present invention in such a "hubless" holder much like the high density disk 913 in FIGS. 9B and 9C. Beyond or behind the disk product 913, in its "hubless" holder 911, consumers behold a graphic and text background printed on the cover of the related book 915 as well as around the perimeter of the backpiece 913.

While FIGS. 9B and 9C show a "hubless" mount 911 of only one high density disk product 913, "blister pack" embodiments of the present invention can contain a plurality of "hubless" disk mountings. Furthermore, a "blister pack" embodiment can package CDROMs or other digital disk media with accessible center holes mounted on pedestals and hubs, as already detailed in relation to FIGS. 5A and 5B. Such an adaptation of the mounting technique preferred for reduced visual distortion involves the formation of pedestal and hub mounts, as disclosed further above in relation to FIGS. 3A–3D, modifying the lower piece 919 shown in FIG. 9B and 9C. Generally, these "blister pack" embodiments present the advantages of simpler and probably cheaper parts and reduced assembly and packaging efforts. While the wraparound "blister" appears to increase visibility, shaping the blister pieces will introduce distortion, obscuring fine print and fine points of the package contents. "Blister pack" embodiments offer less surface area for printing text and graphics for want of interior surfaces plus lateral surfaces and bookflaps. There is perhaps also more subjective visual intrigue and drama in visualizing disk products and background product information inside of a partially closed outer package through a relatively small window or aperture.

I claim:

1. A package for one or more disk products, each generally formed with a center hole comprising:
   a box formed with outer and inner surfaces spaced from each other for presenting one or more disk products between the surfaces, said outer surface being composed of substantially transparent material so that each disk product is visible through the outer surface;
   said box being formed with at least first and second hubs on the inner surface each with a free end extending toward the outer surface, each said free end of each hub being constructed to pass through a center hole of each disk product, each hub having formed thereon a holding surface for holding at least one of said one or more disk products suspended thereupon so that it does not contact the inner surface; and
   said at least first and second hubs being horizontally separated one from another by a positive distance that is substantially less than a diameter of said disk product.

2. The disk product package of claim 1 wherein the box is composed of substantially transparent plastic.

3. The disk product package of claim 1 wherein the outer surface of the box is formed as a hinged cover, and further comprising snap means for securing the hinged cover in closed position.

4. The disk product package of claim 3 wherein a plurality of said boxes are formed for stacking and nesting when empty with the hinged covers in open position.

5. The disk product package of claim 1 wherein each holding surface of each hub is formed as a flat surface parallel with the outer and inner surfaces, each hub further being constructed to hold at least one of said one or more disk products on each holding surface by friction fit.

6. The disk product package of claim 1 wherein the holding surface of the first hub being formed separate from the holding surface of the second hub for display of two disk products.

7. The disk product package of claim 1 wherein the box is vacuum formed from a plastic flexible foldable sheet material that is substantially transparent.

8. The disk product package of claim 7 wherein the sheet material is polyvinyl chloride in a size range of 13–17 gauge.

9. The disk product package of claim 1 wherein each holding surface on each hub is formed closer to the outer surface of the box than the inner surface for presenting at least one of said one or more disk products closer to the outer surface.

10. The disk product package of claim 1 wherein each hub formed on the inner surface extends substantially the distance to the outer surface for supporting the outer surface and for maintaining a specified spacing between the inner and outer surfaces.

11. The disk product package of claim 1 wherein the top of each hub is fitted with a cap for retaining at least one of said one or more disk products on each hub.

12. A package for a disk product generally formed with a center hole comprising:
   an inner box formed with outer and inner surfaces spaced from each other for presenting a disk product between the surfaces, said outer surface being composed of substantially transparent material so that the disk product is visible through the outer surface;
   said inner box being formed with at least one hub on the inner surface with a free end extending toward the outer surface, said free end of the hub being constructed to pass through the center hole of the disk product, said hub having formed thereon a holding surface for holding a disk product suspended on the hub so that it does not contact the inner surface; and
   an outer box enclosing the inner box, said outer box composed of material bearing printing and graphics and being formed with inner and outer surfaces, said outer surface of the outer box being formed with a window for visibility of the disk product through the window and outer surface of the inner box, the outer box including a bookflap hinged at one side of the outer box, said bookflap being formed with a bookflap window overlapping the outer box window, said bookflap window being slightly smaller than the outer box window for holding the inner box in the outer box around the window.

13. The disk product package of claim 12 wherein the inner box is composed of substantially transparent plastic, the outer box is composed of cardboard, and said disk product package includes an outer wrapping that is a shrink wrap.

14. The disk product package of claim 13 wherein the outer box is formed with a frame around the window, said frame including specified widths of the outer surface around the window and spacers secured between the inner and outer surfaces of the outer box around the frame.

15. The disk product package of claim 14 wherein the inner box is composed of substantially transparent plastic material and the outer box is composed substantially of cardboard, and wherein the spacers are folded pieces of cardboard glued between the inner and outer surfaces of the outer box.

16. The disk product package of claim 13 wherein the inner surface of the inner box is formed with at least first and second hubs, the holding surface of the first hub being formed separate from the holding surface of the second hub for display of two disk products.

17. The disk product package of claim 13 wherein the holding surface of the hub is formed as a flat surface substantially parallel to the inner and outer surfaces, said hub being constructed to hold the disk product on the holding surface by friction fit.

18. The disk product package of claim 13 wherein the holding surface on the hub is formed closer to the outer surface of the box than the inner for presenting a disk product closer to the outer surface.

19. The disk product package of claim 12 wherein the inner box is formed with dimensions for loading into the outer box through the outer box window.

20. The disk product package of claim 12 wherein the outer surface of the inner box, outer box window, and bookflap window are formed with dimensions permitting visibility of substantially the entire disk product.

21. The disk product package of claim 12 wherein the outer surface of the inner box is formed as a hinged cover, and further includes snap means for securing the hinged cover in a closed position.

22. The disk product package of claim 21 wherein a plurality of said inner boxes are formed for stacking and nesting when empty with the hinged covers in open position.

23. The disk product package of claim 12 wherein the inner box is vacuum formed from a plastic flexible foldable sheet material that is substantially transparent.

24. The disk product package of claim 23 wherein the sheet material is polyvinyl chloride in a size range of 13–17 gauge.

25. The disk product package of claim 12 wherein the outer box further includes a bookflap hinged at one side to the outer box, said bookflap being formed with a window overlapping the outer box window for visibility of the disk product.

26. The disk product package of claim 12 wherein the hub formed on the inner surface extends substantially the distance to the outer surface for supporting the outer surface and for maintaining a specified spacing between the inner and outer surfaces.

27. The disk product package of claim 12 wherein the top of the hub is fitted with a cap for retaining a disk product on the hub.

28. The package of claim 12 further including a visual background visible behind the disk product through the transparent outer surface of the inner box and the outer box window, said visual background conveying information related to subject matter of the disk product.

29. The package of claim 28 wherein the visual background includes literature accompanying the disk product, said literature being packaged with the disk product.

30. The package of claim 29 wherein the literature includes a book accompanying the disk product, said visual background including the cover of said book.

31. The package of claim 12 wherein the hub is formed with a holding surface for holding a disk product suspended on the hub so that it does not contact either of the inner and outer surfaces.

32. The package of claim 12 including an outer substantially transparent wrapping enclosing the inner and outer boxes.

33. A package for one or more disk products, each generally formed with a center hole comprising:

an inner box formed with outer and inner surfaces spaced from each other for presenting one or more disk products between the surfaces, said outer surface being composed of substantially transparent material so that said one or more disk products are visible through the outer surface;

said inner box being formed with at least first and second hubs on the inner surface each with a free end extending toward the outer surface, each said free end of each hub being constructed to pass through a center hole of each disk product, each hub having formed thereon a holding surface for holding at least one of said one or more disk products suspended thereupon so that it does not contact the inner surface;

said at least first and second hubs being horizontally separated one from another by a positive distance that is substantially less than a diameter of said disk product;

an outer box enclosing the inner box, said outer box composed of material bearing printing and graphics and being formed with inner and outer surfaces, said outer surface of the outer box being formed with a window for visibility of the disk product through the window and outer surface of the inner box;

said outer box being formed with a frame around the window, said frame including specified widths of the outer surface of the outer box around the window and spacers secured between the inner and outer surfaces of the outer box around the frame;

said outer box further including a bookflap hinged at one side of the outer box, said bookflap being formed with a window overlapping the outer box window;

the outer surface of the inner box, outer box window, and bookflap window being formed with dimensions permitting visibility of substantially the entire disk product.

34. The disk product package of claim 33 wherein the inner box is formed with dimensions for loading into the outer box through the outer box window, said bookflap window being smaller than the outer box window thereby retaining the inner box in the outer box.

35. The disk product package of claim 34 wherein each holding surface of each hub is formed as a flat surface parallel with the inner and outer surfaces of the inner box, each hub being constructed to hold at least one of said one or more disk products on each holding surface by friction fit.

36. The disk product package of claim 33 wherein the holding surface of the first hub being formed above the holding surface of the second hub for display of two disk products at two levels, said hubs being positioned so that the disk products overlap each other.

37. The disk product package of claim 33 wherein each holding surface on each hub is formed closer to the outer surface of the box than the inner surface for presenting at least one of said one or more disk products closer to the outer surface.

38. The disk product package of claim 33 wherein each hub formed on the inner surface extends substantially a distance to the outer surface for supporting the outer surface and for maintaining a specified spacing between the inner and outer surfaces.

39. The disk product package of claim 33 wherein the top of each hub is fitted with a cap for retaining at least one of said one or more disk products on each hub.

40. The package of claim 33 including a visual background visible behind the disk product through the transparent outer surface of the inner box and the outer box window and bookflap window, said visual background conveying information related to subject matter of the disk product.

41. The package of claim 40 wherein the visual background includes literature accompanying the disk product, said literature being packaged with the disk product.

42. The package of claim 41 wherein the literature includes a book accompanying the disk product, said visual background including the cover of said book.

43. The package of claim 33 wherein each one of said one or more disk products suspended on each hub is suspended so that it does not contact either of the inner and outer surfaces.

44. The package of claim 33 including an outer substantially transparent wrapping enclosing the inner and outer boxes.

* * * * *